(12) United States Patent
Liu et al.

(10) Patent No.: US 8,111,619 B2
(45) Date of Patent: Feb. 7, 2012

(54) APPARATUS AND METHOD FOR ROUTING DATA IN WIRELESS NETWORKS

(75) Inventors: Haiyang Liu, Blaine, MN (US); Soumitri N. Kolavennu, Blaine, MN (US)

(73) Assignee: Honeywell International Inc., Morristown, NJ (US)

( * ) Notice: Subject to any disclaimer, the term of this patent is extended or adjusted under 35 U.S.C. 154(b) by 874 days.

(21) Appl. No.: 12/120,005

(22) Filed: May 13, 2008

(65) Prior Publication Data

US 2009/0201899 A1  Aug. 13, 2009

Related U.S. Application Data

(60) Provisional application No. 61/027,146, filed on Feb. 8, 2008.

(51) Int. Cl.
*G01R 31/08* (2006.01)
(52) U.S. Cl. ...................................................... 370/229
(58) Field of Classification Search .................. None
See application file for complete search history.

(56) References Cited

U.S. PATENT DOCUMENTS

| | | | |
|---|---|---|---|
| 2004/0125753 A1* | 7/2004 | Mahany et al. | 370/254 |
| 2009/0168653 A1* | 7/2009 | St. Pierre et al. | 370/238 |

OTHER PUBLICATIONS

Haiyang Liu et al., "Apparatus and Method for Routing Data in Wireless Networks", U.S. Appl. No. 12/120,005, filed May 13, 2008.
Haiyang Liu et al., "PWave: A Multi-source Multi-sink Anycast Routing Framework for Wireless Sensor Networks", Proceedings of the 6th International IFIP-TC6 Networking Conference, NETWORKING 2007, May 2007, 12 pages.
Sanjit Biswas et al., "ExOR: Opportunistic Multi-Hop Routing for Wireless Networks", SIGCOMM '05, Aug. 21-26, 2005, 11 pages.
Szymon Chachulski et al., "Trading Structure for Randomness in Wireless Opportunistic Routing", SIGCOMM '07, Aug. 27-31, 2007, 12 pages.
Douglas S.J. De Couto et al., "A High-Throughput Patch Metric for Multi-Hop Wireless Routing", MobiCom '03, Sep. 14-19, 2003, 13 pages.
Rudolf Ahlswede et al., "Network Information Flow", IEEE Transactions on Information Theory, vol. 46, No. 4, Jul. 2000, pp. 1204-1216.
Shuo-Yen Robert Li et al., "Linear Network Coding", IEEE Transactions on Information Theory, vol. 49, No. 2, Feb. 2003, pp. 371-381.
Desmond S. Lun et al., "Efficient Operation of Wireless Packet Networks Using Network Coding", INTERNATIONAL Workshop on Convergent Technologies (IWCT), 2005, pp. 1-5.

(Continued)

*Primary Examiner* — Chi Pham
*Assistant Examiner* — Fan Ng

(57) ABSTRACT

A method includes identifying, at a first wireless node, routing costs associated with routing data to a destination through multiple paths in a wireless network. The method also includes identifying, at the first wireless node, information propagation values associated with the first wireless node and at least one second wireless node. The information propagation values are based on the routing costs and wireless link qualities associated with the wireless nodes. The method further includes scheduling transmission of the data by the first wireless node based on the information propagation values and transmitting the data based on the scheduling. The routing costs may include potential values associated with distances of the wireless nodes from the destination. Also, the information propagation values indicate which of the wireless nodes have a greater chance of propagating the data towards the destination in a single broadcast.

20 Claims, 6 Drawing Sheets

OTHER PUBLICATIONS

Alec Woo et al. "Taming the Underlying Challenges of Reliable Multihop Routing in Sensor Networks", SenSys '03, Nov. 5-7, 2003, 14 pages.

Gang Lu et al., "Delay Efficient Sleep Scheduling in Wireless Sensor Networks", 2005 IEEE, pp. 2470-2481.

Peter G. Doyle et al., "Random walks and electric networks", Jul. 5, 2006, pp. 1-118.

Haifeng Qian et al., "Power Grid Analysis Using Random Walks", IEEE Transactions on Computer-Aided Design of Integrated Circuits and Systems, vol. 24, No. 8, Aug. 2005, pp. 1204-1224.

"Relaxation Methods for Boundary Value Problems", Partial Differential Equations, pp. 854-862.

Chalermek Intanagonwiwat et al., "Directed Diffusion: A Scalable and Robust Communication Paradigm for Sensor Networks", 12 pages.

Philip Levis et al., "TOSSIM: Accurate and Scalable Simulation of Entire TinyOS Applications", 12 pages.

Mark LaPedus, "Intel Harnesses Wireless Sensors For Chip-Equipment Care", techweb network, Oct. 29, 2003, 2 pages.

Fan Ye et al., "A Scalable Solution to Minimum Cost Forwarding in Large Sensor Networks", 6 pages.

\* cited by examiner

APPARATUS AND METHOD FOR ROUTING DATA IN WIRELESS NETWORKS

CROSS-REFERENCE TO RELATED APPLICATIONS

This application claims priority under 35 U.S.C. §119(e) to U.S. Provisional Application No. 61/027,146 filed on Feb. 8, 2008, which is hereby incorporated by reference.

GOVERNMENT LICENSE RIGHTS

The U.S. Government has a paid-up license in this invention and the right in limited circumstances to require the patent owner to license others on reasonable terms as provided for by the terms of contract no. N00014-09-C-0163 awarded by the Office of Naval Research.

TECHNICAL FIELD

This disclosure relates generally to wireless networks. More specifically, this disclosure relates to an apparatus and method for routing data in wireless networks.

BACKGROUND

Wireless mesh networks are increasingly used to provide inexpensive network connectivity in unlicensed spectrums. Examples include municipal wireless fidelity (WiFi) networks that provide cheap Internet access and wireless sensor networks (WSNs) that provide low cost process monitoring and control capabilities for industrial facilities.

Routing in these types of wireless networks often plays an important or critical role for applications to deliver high-performance and highly robust services. However, routing in these types of networks often exhibits distinctive characteristics compared to wireline networks (such as Ethernet networks), infrastructured wireless networks (such as cellular telephone networks), and even many ad-hoc wireless networks (such as MANET networks). Some characteristics of these types of wireless networks that can significantly affect routing protocol design include: highly lossy links (such as less than 50% successful transmissions); small packet size (such as less than 50 bytes); time-sensitive data; and large and dynamic network sizes.

Conventional protocols used in these types of wireless networks generally suffer low data throughput due to many inevitable link-level retransmissions caused by the low link quality. Conventional protocols also respond poorly to network dynamics since they need to maintain information on global paths from sources to destinations. For instance, current techniques typically require the maintenance of global information (such as global forwarder lists), which means these techniques are not easily scalable. Further, large batch sizes can make current techniques inefficient in handling small data payloads, and current techniques are often unsuitable for routing of time-sensitive data (which is commonly seen in WSNs).

In addition, current techniques typically suffer a fundamental misuse of path metrics that can be important or essential for the evaluation of "distances" to destinations. Current techniques often use Expected Transmission Count (ETX), which uses an expected number of transmissions to measure a link cost and a minimum cost of all possible paths as the path metric. ETX has been widely used in best path routings, where the single shortest path is used for all data forwarding. However, ETX is clearly a mismatch when used with opportunistic routing, which by nature forwards data on multiple paths non-deterministically and potentially simultaneously.

SUMMARY

This disclosure provides an apparatus and method for routing data in wireless networks.

In a first embodiment, a method includes identifying, at a first wireless node, routing costs associated with routing data to a destination through multiple paths in a wireless network. The method also includes identifying, at the first wireless node, information propagation values associated with the first wireless node and at least one second wireless node. The information propagation values are based on the routing costs and wireless link qualities associated with the wireless nodes. The method further includes scheduling transmission of the data by the first wireless node based on the information propagation values and transmitting the data based on the scheduling.

In a second embodiment, a wireless node includes a transceiver configured to communicate wirelessly with at least one second wireless node. The wireless node also includes a controller configured to identify routing costs associated with routing data to a destination through multiple paths in a wireless network. The controller is also configured to identify information propagation values associated with the wireless node and the at least one second wireless node. The information propagation values are based on the routing costs and wireless link qualities associated with the wireless nodes. The controller is further configured to schedule transmission of the data based on the information propagation values and to initiate the transmission of the data based on the scheduling.

In a third embodiment, a method includes identifying a source set and a destination set associated with a many-to-many multicast of data in a wireless network. The source set includes multiple destination wireless nodes to receive the data, and the destination set includes multiple source nodes to provide the data. The method also includes identifying potential values for wireless nodes in the wireless network and identifying forwarding probabilities for the wireless nodes based on the potential values. The method further includes reversing communication links between the source set and the destination set. In addition, the method includes routing the data through the wireless network from the source set to the destination set using the forwarding probabilities.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
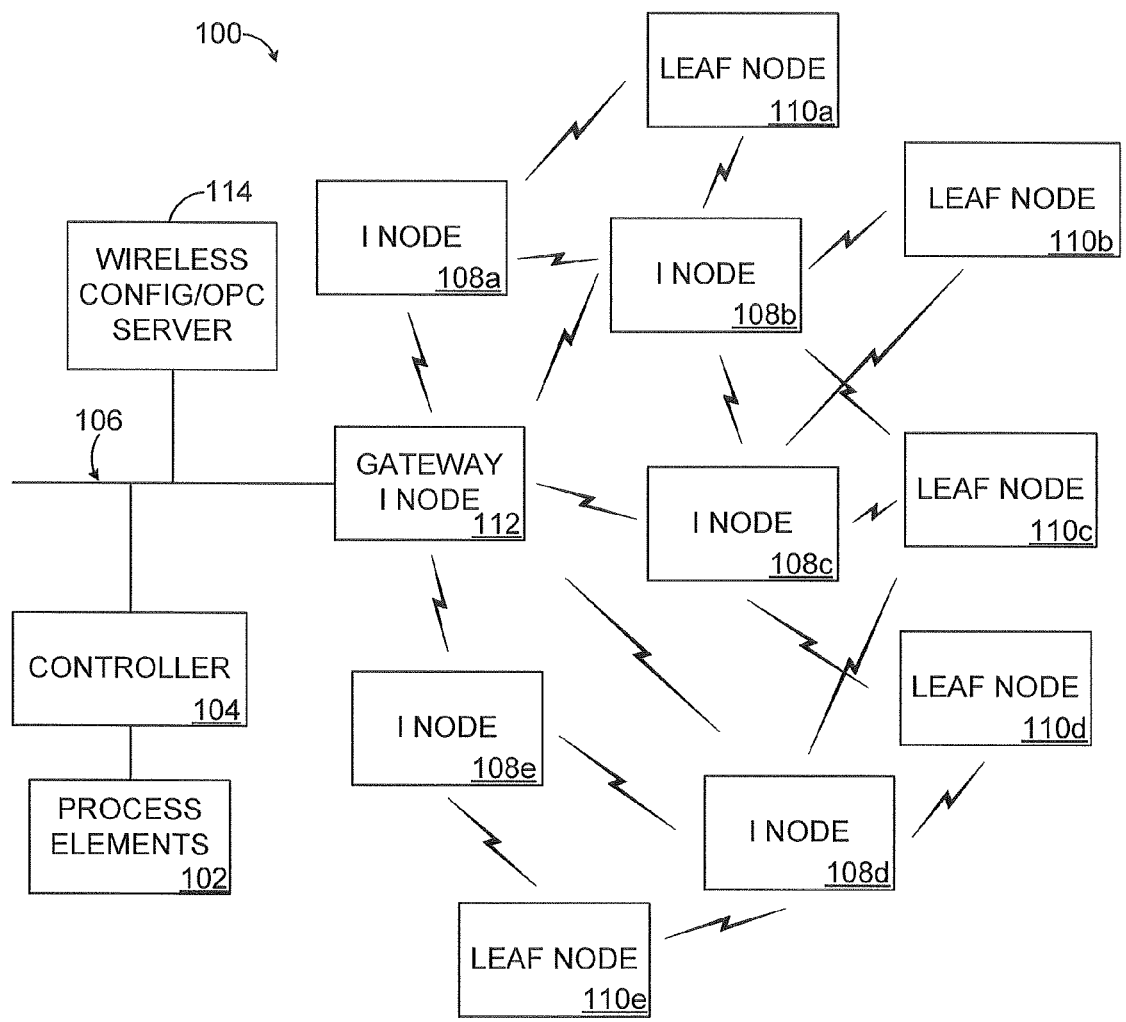
FIG. 1 illustrates an example industrial control and automation system in accordance with this disclosure.

FIG. 1 illustrates an example industrial control and automation system 100 in accordance with this disclosure. The embodiment of the industrial control and automation system 100 shown in FIG. 1 is for illustration only. Other embodiments of the industrial control and automation system 100 could be used without departing from the scope of this disclosure.

In this example embodiment, the industrial control and automation system 100 includes one or more process elements 102. The process elements 102 represent components in a process or production system that may perform any of a wide variety of functions. For example, the process elements 102 could represent sensors, actuators, or any other or additional industrial equipment in a processing environment. Each of the process elements 102 includes any suitable structure for performing one or more functions in a processing or production system. Also, the phrase "industrial control and automation system" generally refers to a system that automates and controls at least one process.

A controller 104 is coupled to the process elements 102. The controller 104 controls the operation of one or more of the process elements 102. For example, the controller 104 could receive information associated with the system 100, such as by receiving sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks (LANs), metropolitan area networks (MANs), wide area networks (WANs), all or a portion of a global network such as the Internet, or any other communication system or systems at one or more locations.

As shown in FIG. 1, the industrial control and automation system 100 also includes one or more wireless networks for communicating with wireless sensors or other wireless devices. In this example, a wireless network (such as a mesh network) is formed using infrastructure nodes ("I nodes") 108a-108e, leaf nodes 110a-110e, and a gateway infrastructure node 112.

The infrastructure nodes 108a-108e and the leaf nodes 110a-110e engage in wireless communications with each other. For example, the infrastructure nodes 108a-108e may receive data transmitted over the network 106 (via the gateway infrastructure node 112) and wirelessly communicate the data to the leaf nodes 110a-110e. Similarly, the leaf nodes 110a-110e may wirelessly communicate data to the infrastructure nodes 108a-108e for forwarding to the network 106 (via the gateway infrastructure node 112). In addition, the infrastructure nodes 108a-108e may wirelessly exchange data with one another. In this way, the nodes 108a-108e and 110a-110e form a wireless network capable of providing wireless coverage to a specified area, such as in a large industrial complex.

In this example, the nodes 108a-108e and 110a-110e are divided into infrastructure nodes and leaf nodes. The infrastructure nodes 108a-108e typically represent line-powered devices, meaning these nodes receive operating power from an external source. As a result, these nodes 108a-108e are typically not limited in their operations since they need not minimize power consumption to increase the operational life of their internal power supplies. On the other hand, the leaf nodes 110a-110e typically represent battery-powered devices, meaning these nodes receive operating power from internal batteries or other power supplies. Because of this, these nodes 110a-110e are often more limited in their operations in order to help preserve the operational life of their internal power supplies.

Each of the nodes 108a-108e and 110a-110e includes any suitable structure facilitating wireless communications, such as a radio frequency (RF) transceiver. Each of the nodes 108a-108e and 110a-110e could also include other functionality, such as functionality for generating or using data communicated over the wireless network. For example, the leaf nodes 110a-110e could represent wireless sensors in an industrial facility, where the sensors are used to measure various characteristics within the facility. These sensors could collect sensor readings and communicate the sensor readings to the controller 104 via the gateway infrastructure node 112. The leaf nodes 110a-110e could also represent actuators that can receive control signals from the controller 104 and adjust the operation of the industrial facility. In this way, the leaf nodes 110a-110e may include or operate in a similar manner as the process elements 102 that are physically connected to the controller 104. The leaf nodes 110a-110e could further represent handheld user devices (such as INTELATRAC devices from HONEYWELL INTERNATIONAL INC.), mobile stations, programmable logic controllers (PLCs), or any other or additional devices.

In particular embodiments, the leaf nodes 110a-110e can include 802.15.4-based low data-rate sensors and 802.11-based high data-rate devices, and the various nodes in FIG. 1 form a mesh network communicating at 2.4 GHz or 5.8 GHz. Also, in particular embodiments, data can be injected into the wireless mesh network through the infrastructure nodes, thus providing versatile, multifunctional, plant-wide coverage for wireless sensing, asset location tracking, personnel tracking, wireless communications, and any other or additional functionality as desired.

The gateway infrastructure node 112 communicates wirelessly with, transmits data to, and receives data from one or more infrastructure nodes 108a-108e and possibly one or more leaf nodes 110a-110e. The gateway infrastructure node 112 also converts data between the protocol(s) used by the network 106 and the protocol(s) used by the nodes 108a-108e and 110a-110e. For example, the gateway infrastructure node 112 could convert Ethernet-formatted data (transported over the network 106) into a wireless protocol format (such as an IEEE 802.11a, 802.11b, 802.11g, 802.11n, 802.15.3, 802.15.4, or 802.16 protocol format) used by the nodes 108a-108e and 110a-110e. The gateway infrastructure node 112 could also convert data received from one or more of the nodes 108a-108e and 110a-110e into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

In this example, a wireless configuration and OLE for Process Control (OPC) server 114 can be used to configure and control various aspects of the process control system 100. For example, the server 114 could be used to configure the operation of the infrastructure nodes 108a-108e and the gateway node 112. The server 114 could also be used to support security in the industrial control and automation system 100. For instance, the server 114 could distribute cryptographic keys or other security data to various components in the industrial control and automation system 100, such as to the nodes 108a-108e, 110a-110e, and 112. The server 114 includes any hardware, software, firmware, or combination thereof for configuring wireless networks and providing security information.

As described in more detail below, any or all of the various nodes in the wireless network (such as 108a-108e, 110a-110e, 112) could support a routing protocol called "Chaotic Routing" (CR), which can achieve efficient information diffusion with seemingly chaotic local information exchanges. For example, these nodes could execute computer programs or other instructions to support or provide the Chaotic Routing architecture described below.

Although FIG. 1 illustrates one example of an industrial control and automation system 100, various changes may be made to FIG. 1. For example, the industrial control and automation system 100 could include any number of process elements, controllers, networks (wired or wireless), infrastructure nodes (gateway or other), leaf nodes, and servers. Also, the functional division shown in FIG. 1 is for illustration only. Various components in FIG. 1 could be combined, subdivided, or omitted and additional components could be added according to particular needs. Further, while described as supporting a wired network and a wireless network, the industrial control and automation system 100 could support any number of wireless or wired networks. In addition, FIG. 1 illustrates one example operational environment in which Chaotic Routing functionality could be used. This functionality could be used in any other suitable system (whether or not related to process control).

Figure 2:
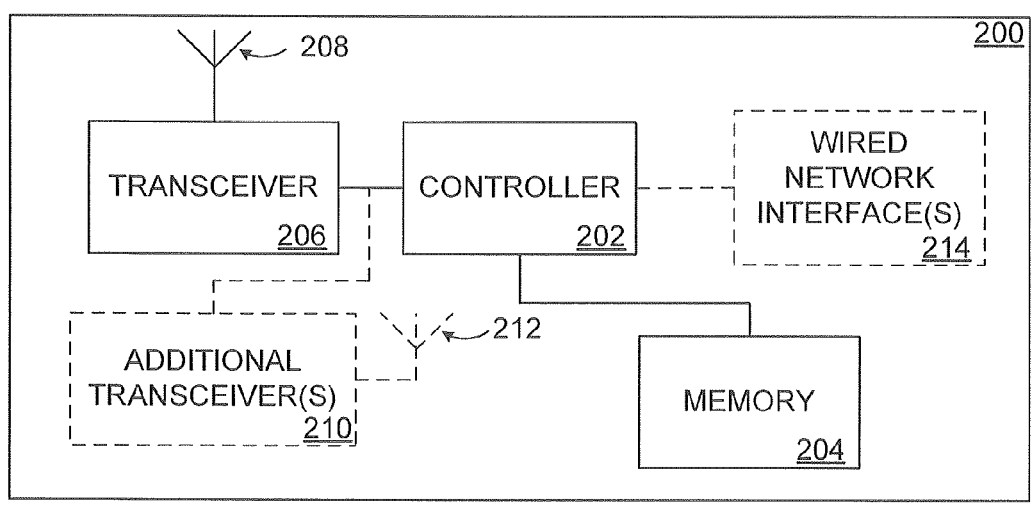
FIG. 2 illustrates an example wireless node in an industrial control and automation system in accordance with this disclosure.

FIG. 2 illustrates an example wireless node 200 in an industrial control and automation system according to this disclosure. The wireless node 200 could, for example, represent a leaf node, infrastructure node, or gateway infrastructure node in the system 100 of FIG. 1 or other system. The embodiment of the wireless node 200 shown in FIG. 2 is for illustration only. Other embodiments of the wireless node 200 could be used without departing from the scope of this disclosure.

As shown in FIG. 2, the wireless node 200 includes a controller 202. The controller 202 controls the overall operation of the wireless node 200. For example, the controller 202 may receive or generate data to be transmitted externally, and the controller 202 could provide the data to one or more other components in the wireless node 200 for transmission over a wired or wireless network. The controller 202 could also receive data over a wired or wireless network and use or pass on the data. As a particular example, the controller 202 in a sensor leaf node could provide sensor data for transmission, and the controller 202 in an actuator leaf node could receive and implement control signals (note that a leaf node could represent a combined sensor-actuator device). As another example, the controller 202 in an infrastructure node could receive data transmitted wirelessly and use the Chaotic Routing functionality described below to determine whether the data should be forwarded or further transmitted. As a third example, the controller 202 in a gateway infrastructure node 112 could receive data from a wired network and provide the data for wireless transmission (or vice versa). The controller 202 could perform any other or additional functions to support the operation of the wireless node 200, such as various Chaotic Routing functions described below. The controller 202 includes any suitable hardware, software, firmware, or combination thereof for controlling the operation of the wireless node 200. As particular examples, the controller 202 could represent a processor, microprocessor, microcontroller, field programmable gate array (FPGA), or other processing or control device.

A memory 204 is coupled to the controller 202. The memory 204 stores any of a wide variety of information used, collected, or generated by the wireless node 200. For example, the memory 204 could store information received over a network that is to be transmitted over the same or different network. The memory 204 could also store any data generated, used, or collected by the wireless node 200 that is related to the Chaotic Routing functions described below. The memory 204 includes any suitable volatile and/or non-volatile storage and retrieval device or devices.

The wireless node 200 also includes a wireless transceiver 206 coupled to an antenna 208. The transceiver 206 and antenna 208 can be used by the wireless node 200 to communicate wirelessly with other devices. For example, in a leaf node, the transceiver 206 and antenna 208 can be used to communicate with infrastructure nodes. In an infrastructure node or gateway infrastructure node, the transceiver 206 and antenna 208 can be used to communicate with leaf nodes. One or more additional transceivers 210 could also be used in the wireless node 200. For instance, in an infrastructure node or gateway infrastructure node, the additional transceiver(s) 210 could be used to communicate with WiFi devices and with other infrastructure nodes or gateway infrastructure nodes. The additional transceivers 210 may be coupled to their own antenna(s) 212 or share one or more common antennas (such as antenna 208). Each transceiver 206, 210 includes any suitable structure for generating signals for wireless transmission and/or receiving signals received wirelessly. In some embodiments, each transceiver represents an RF transceiver, and each antenna represents an RF antenna (although any other suitable wireless signals could be used to communicate). Also, each transceiver could include a transmitter and a separate receiver.

If the wireless node 200 represents a gateway infrastructure node, the wireless node 200 may further include one or more wired network interfaces 214. The wired network interfaces 214 allow the wireless node 200 to communicate over one or more wired networks, such as the network 106. Each wired network interface 214 includes any suitable structure for transmitting and/or receiving signals over a wired network, such as an Ethernet interface.

Although FIG. 2 illustrates one example of a wireless node 200 in an industrial control and automation system, various changes may be made to FIG. 2. For example, various components in FIG. 2 could be combined, subdivided, or omitted and additional components could be added according to particular needs. Also, in general, a "wireless node" may represent any device that can transmit and/or receive data wirelessly (even if the "wireless node" has the ability to transmit and/or receive data over a wired connection, as well).

FIGS. 3 through 7 illustrate an example routing mechanism for data in a wireless network in accordance with this disclosure. The details of the routing mechanism shown in FIGS. 3 through 7 are for illustration only. The routing mechanism could be implemented in any other suitable manner without departing from the scope of this disclosure.

As noted above, a routing protocol called "Chaotic Routing" can achieve efficient information diffusion with seemingly chaotic local information exchanges in a wireless network. By leveraging networking concepts such as potential based routing, opportunistic routing, and network coding, Chaotic Routing can achieve a reduced number of transmissions and therefore provide improved throughput. This can be done using functions such as accurate routing cost estimation of opportunistic data forwarding and localized propagation of node scheduling optimizing information in mesh structures. It can be shown that Chaotic Routing may outperform, in terms of throughput, best deterministic routing schemes like best path routing (such as by a factor of around 300%) and may outperform best opportunistic routing schemes like MORE (such as by a factor of around 200%). Chaotic Routing can show stable performance over a wide range of network densities, link qualities, and batch sizes.

Figure 3:
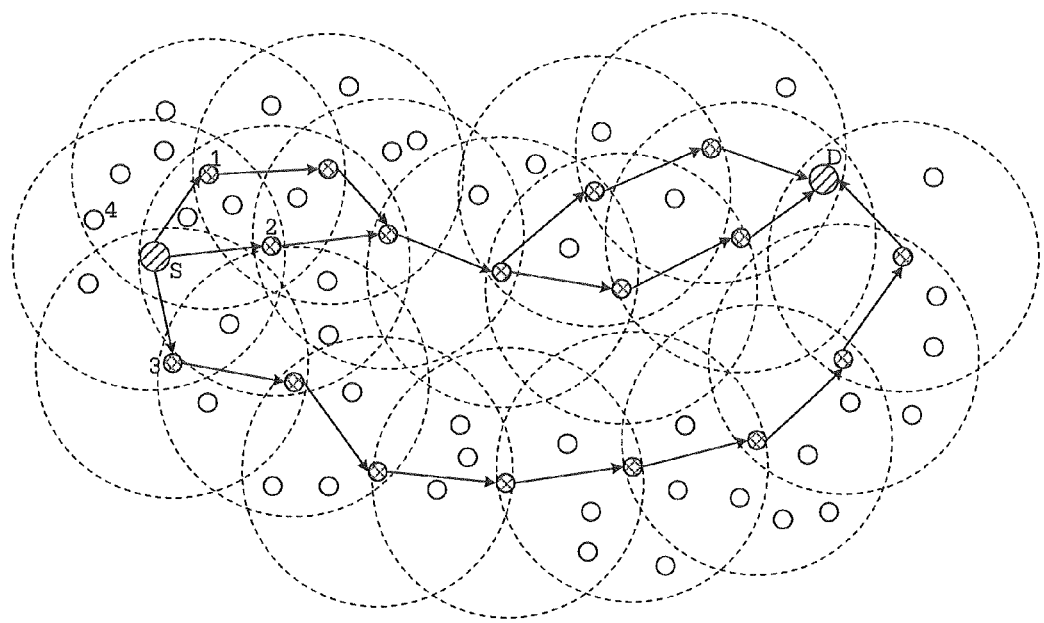
FIGS. 3 through 7 illustrate an example routing mechanism for data in a wireless network in accordance with this disclosure.

An example of Chaotic Routing is shown in FIG. 3. As shown here, an information flow occurs from a source node S to a destination node D along three paths (namely a lower path and two upper paths that partially overlap). The dashed circles in FIG. 3 denote the ranges or interference contours of various wireless nodes shown in FIG. 3 (namely the source node S, the destination node D, and the various nodes transporting data along the three indicated paths).

During Chaotic Routing, in a single broadcast at the source node S, nodes 1-4 could receive one or more data packets or other messages from the source node S. Node 2 in this example is the closest of nodes 1-4 to the destination node D, so node 2 has the highest priority to forward the received data message(s). Nodes 1 and 3 are farther away from the destination node D and therefore wait longer to forward the received data message(s) in order to explore other paths (the upper and lower paths in FIG. 3). Node 4 could overhear the transmission performed by node 1 and therefore suppress its forwarding of the data message(s) since node 4 has the lowest priority. The same process can be repeated at the various nodes along the paths from the source node S to the destination node D. Various nodes along the paths from the source node S to the destination node D may receive a different subset of the data messages transmitted by the source node S. Multiple messages can therefore be aggregated together via network coding to improve transmission efficiency. Link-level acknowledgements can be passively achieved by overhearing neighboring nodes' broadcasts.

Chaotic Routing can achieve efficient information diffusion with seemingly "chaotic" local information exchanges. Chaotic Routing by nature is a broadcast-based multi-path routing protocol, where transmissions do not specify predetermined next-hop receivers. Data messages may therefore be duplicated and routed along multiple paths simultaneously and non-deterministically. Chaotic Routing can achieve reduced delay (thus improved throughput) through features such as opportunistically forwarding messages along multiple paths and message aggregation via network coding. Chaotic Routing can also achieve improved robustness through features such as set-based information propagation, so forwarding failures could occur only when all neighbors of a forwarding node fail simultaneously.

In the Chaotic Routing framework, data is forwarded from one set of nodes to another set of nodes opportunistically without the need to maintain any global information. Local forwarding decisions can be made so that the potential information propagation progress is increased or maximized. Also, a random walk-based path metric (RWM) can be used to measure the cost of routing data along different paths in a wireless network. In some embodiments, the random walk-based path metric can be determined using hitting probabilities in graphs. This metric can also be used in the context of multicasting as described below. A fully distributed algorithm can be used to construct the random walk-based path metric efficiently at multiple nodes in the wireless network. In particular embodiments, this algorithm can scale to the density of the wireless network because only two-hop neighborhood information exchange may be needed. This algorithm can also be highly resilient to network dynamics in that local perturbations only have local effects. These features can help make Chaotic Routing scale to large network sizes, work efficiently over a wide range of batch sizes, and have significantly improved performance over current solutions.

The following describes a system model, a data model, and an overview of the Chaotic Routing architecture. In order to formally define the Chaotic Routing framework, the system model, notations, and assumptions are first introduced. Assume that a WSN or other wireless network can be represented as a weighted (undirected) graph $G=(N,E)$, where N represents the set of nodes and E represents edges (links) between nodes. The links are assumed to be symmetric, meaning both ends of a link/edge can communicate with each other (asymmetric links are often "blacklisted" from being used for data routing). Use $R_{x,y}$ to denote the weight of an edge e connecting nodes x and y, which is strictly positive here ($R_{x,y}>0$). This weight represents some measure of unit cost for transmitting one bit of information between x and y defined in certain manners depending on the applications and routing design objectives (some examples of $R_{x,y}$ are provided later.) Hence, if $I_{x,y}$ amount of data is transmitted from x to y, the total cost could be expressed as $I_{x,y} \cdot R_{x,y}$. For simplicity, assume that data traffic only flows along one direction of an edge, either from x to y or from y to x (this ignores the acknowledgement of data traffic that flows along the other direction, the cost of which is in a sense implicitly accounted for in $R_{x,y}$). Under this assumption, $I_{x,y}$ denotes the data rate flowing from x to y, and $I_{x,y}=-I_{y,x}$. The same relation also holds if $I_{x,y}$ is the data rate flowing from y to x.

Let $S \subset N$ denote the set of source nodes, and let $D \subset N$ denote the set of sink (destination) nodes. For each $s \in S$, $I_s$ denotes the data rate that may be generated by source node s. More generally, to account for potential in-network processing at intermediate nodes in a WSN or other network that may increase or decrease the data rate flowing through them, for each $x \in (N-D)$, use $I_x$ to denote the (internal) data generation/consumption rate at node x. Note here $I_x>0$ means that data is generated at node x, while $I_x<0$ means that data is consumed at node x. For each node $x \in N$, use $Z(x)$ to denote the set of its neighboring nodes. The flow conservation law may require that, for any node x that is not a sink, the total of data rates flowing into node x is equal to the total of data flowing out of node x plus or minus the data rate generated or consumed at node x itself. This can be expressed as:

$$\sum_{y \in Z(x)} I_{x,y} = I_x, x \in (N-D). \quad (1)$$

Given the graph G representing a WSN or other network and $I:=\{I_x | x \in N\}$, refer to the tuple (G,I) as a network configuration NC. Given a network configuration NC, opportunistic routing cost estimation for a WSN or other network can be cast as a global flow allocation problem to determine the flows $\{I_{x,y}\}$ along the links under the flow conservation constraints (Equation 1) and boundary conditions (Equation 2) such that the cost is a combination of line costs weighted by the flows allocated on them. In Chaotic Routing, the mathematical equivalence of random walk games and the optimal flow allocation problem are leveraged to design the path metric RWM that is dictated by the flow allocations producing minimum effective resistance between source and destinations. RWM generally measures the cost at a node accounting for all possible paths towards the destinations. RWM can be interpreted on multiple levels. In the local neighborhood, the RWM of a node x is the weighted average of costs of node x's neighbors. The weights can be inversely proportional to link costs to respective neighbors. On the network level, the RWM of a node x is proportional to the probability that a random walker, starting from x, will hit the source node before the destination node. Thus, RWM measures the position of a node relative to the source and destination. Note that RWM is a path metric and can be constructed in conjunction with any link metric. Different link metrics may only change the weights of each link or the random walk probability toward a link. As a particular example, ETX can be used as the link metric. In order to eliminate the need of keeping track which messages are received by which nodes, linear random coding schemes similar to that used in MORE can be used.

The data packet models used in Chaotic Routing are now described. In Chaotic Routing, original message streams from a source node are grouped into batches, with each batch containing K original messages. Note that patching messages can be added to make sure every batch has exactly K messages. Also note that lower batch sizes (such as less than 50 messages) may be preferred in order to satisfy the requirements of time-sensitive control applications. Messages in transmission could be linear combinations of some of the original messages given by $$p_j^C = \sum_i c_{ij} p_i,$$

where $p_j^C$ is a coded packet and $\vec{c}_j = (c_{j1}, \ldots, c_{ji}, \ldots, c_{jK})$ is a coding vector. The coding coefficients in the coding vector may be random numbers. Note that the linear random coding of coded messages is still a valid linear random coding of the original messages. It has been proved that the collision probability (the new coding vector is not linearly independent of the previously generated coding vectors) is low.

Given this data transmission model, the message routing problem can be transformed into an information routing problem. In the information routing problem, information can be quantitatively measured by the number of independent linear combinations of original messages in a batch without needing to keep track of each original message that was received.

Overview of Chaotic Routing

Figure 4:
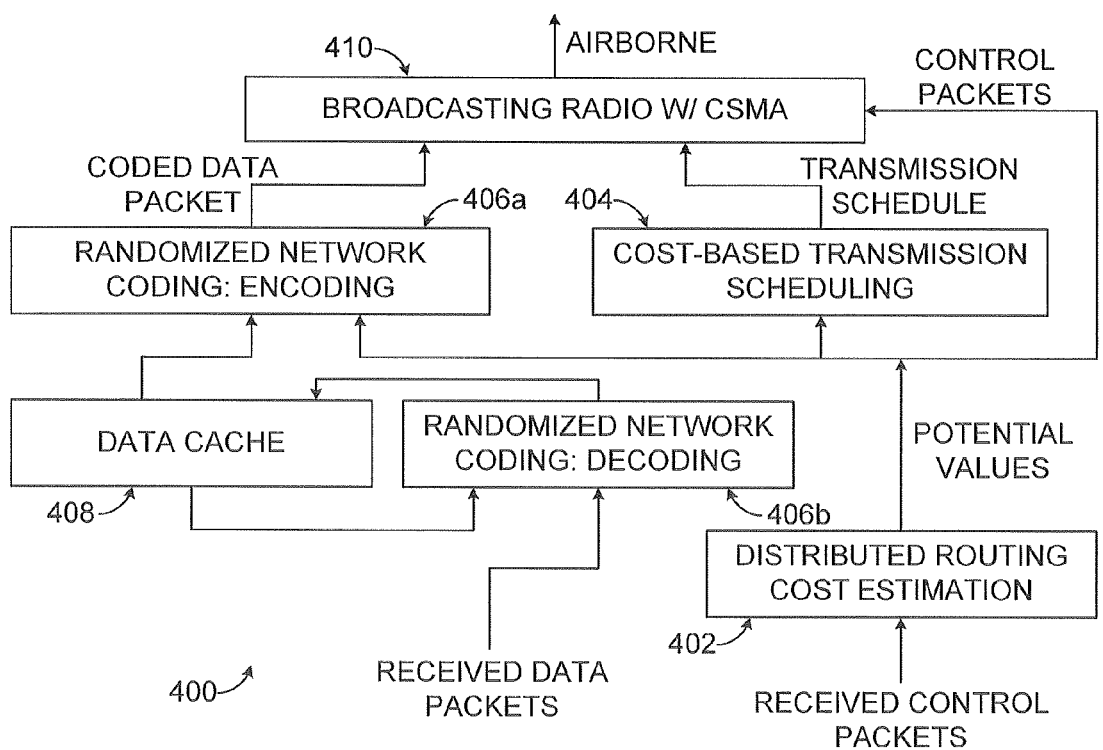

An overview of the Chaotic Routing architecture is shown in FIG. 4. The Chaotic Routing architecture 400 here could be implemented, for example, in the various nodes in a wireless network, such as the infrastructure nodes of the system 100. The Chaotic Routing architecture 400 here supports various functions, including:

Random Walk-Based Path Metric for Opportunistic Routing: this represents a path metric to model the non-deterministic multi-path nature of opportunistic routing with random walks in graphs, and a fully distributed algorithm can be used to efficiently evaluate this metric;

Information Propagation-Driven Localized Scheduling: nodes can be scheduled locally with priorities given to transmissions that have the best expected chances to make the most information propagation toward the destination, and the need for global scheduling can be eliminated; and Set-Based Routing Framework: redundant information in sets of multiple nodes can be maintained and forwarded with added robustness, and a comprehensive routing framework can be built for WSNs and other networks with superior performance.

As shown in FIG. 4, the Chaotic Routing architecture 400 includes or supports the following functions: a Distributed Routing Cost Estimation (DRCE) function 402, a Cost-based Transmission Scheduling (CTS) function 404, and Randomized Network Coding (RNC) functions 406a-406b. The Chaotic Routing architecture 400 also includes a data cache 408 and a broadcasting radio 410. Each of the functions 402-406b could be implemented using any suitable hardware, software, firmware, or combination thereof. The data cache 408 represents any suitable storage and retrieval device(s). The broadcasting radio 410 represents any suitable structure for broadcasting or otherwise transmitting data messages, such as a carrier sense multiple access (CSMA) RF transceiver.

The DRCE function 402 estimates the expected routing cost from a node to the destination in the context of multi-path opportunistic routing, where cost is measured in form of hitting probabilities (using the RWM metric). The cost measure over a network for a possible receiving node is called a "potential" value. As described below, the cost measure of the receiving node is proportional to the probability that a random walker starting from the node hits the source before it hits the destination. This potential value is an effective cost measure because the hitting probability takes into account all possible paths available (rather that the shortest path in traditional metrics). Additional details regarding the DRCE function 402 are provided below.

The CTS function 404 receives the cost measures (potential values) from the DRCE function 402. Based on the cost measures, receiving nodes that receive a data message can schedule the forwarding of the message based on different priorities computed by the CTS function 404 on each node. In general, higher priorities are assigned by the CTS function 404 to those nodes that can make more information propagation progress in a single broadcast. In other words, the CTS function 404 allows the nodes that can make the most progress in information propagation to receive the highest priorities to grab a wireless channel. Additional details regarding the CTS function 404 are provided below.

The Randomized Network Coding functions 406a-406b enable data messages to be routed in batches. For example, in Chaotic Routing, original data messages (denoted as $p_1$, $p_2, \ldots, p_n$) can be routed in batches with batch size N. Each node can maintain a data buffer (data cache 408) of all independent coded messages. Each time a node needs to transmit, an outgoing message can be constructed as a linear combination of the messages in its buffer with random coefficients. Mathematically, an outgoing message $P_o$ can be given by $$P_0 = \sum_i e_i p_i,$$

where $e_i$ is a random integer from field $F_m$. The selection of the size m of the random field can be a tradeoff between the size of the message header (thus overhead of a message transmission) and the probability of a collision (i.e. repeating probability among a sequence of randomized numbers). The larger the value of m is, the less likely (exponentially less likely) a randomly coded message is linearly dependent on previous ones, but more bits may be needed in message headers. In some embodiments, m could equal eight.

Note that linear random coding is closed-field in that a linear random coding of a set of already coded messages is still a linearly random coded combination of original messages, i.e.

$$P_0 = \sum_j e'_j P'_j = \sum_j e'_j \left( \sum_i e_{ji} p_{ji} \right) = \sum_j e''_j p_j$$

where e″ is still a random integer in $F_m$. The destination node may have to receive N independent coded messages in order to reconstruct the original message by taking an inversion of the coding matrix. In Chaotic Routing, this linear random network coding scheme is used to help eliminate global tracking of a message, as exactly which messages have been received by which nodes is no longer valid (instead, the concern is about how many linearly independent messages one node has received). Thus, message routing is transformed into information propagation.

In this architecture 400, data duplications can be controlled by 1) limiting the nodes so that only a portion of nodes serve as forwarders to a broadcast data message, 2) allowing nodes to overhear their neighbors' transmissions and suppress unnecessary duplications (packets with no new information), and 3) aggregating more information into packets via RNC, which can significantly reduces amortized duplications per packet.

Random Walk Based Path Metric (RWM)

In large-scale wireless mesh networks, data routings often go through multiple hops. A routing path metric is often a key parameter needed to make proper routing decisions, which directly affect the performance (such as throughput) of the entire data routing scheme. Traditional routing often relies on shortest-cost single path routing, where the path metric is generally the minimum number of hops or more recently the minimum expected transmission count. In emerging opportunistic routing schemes where data non-deterministically goes through multiple paths simultaneously rather than the single path with shortest cost, a path metric based on shortest cost is clearly a mismatch in accurately estimating the expected number of transmissions needed to route a data packet from the source to the destination.

Given a network topology with varying link qualities, finding a path metric that reflects the routing "distance" from any arbitrary node between a source node S and a destination node D is addressed using the random walk-based metric. This metric estimates the routing cost, which takes into account all possible paths that messages might take. Specifically, a hitting probability can be used to represent the distance from a node to a destination given a (source, destination) communication configuration.

In order to capture the non-deterministic multiple path nature of Chaotic Routing and the objective of achieving maximum throughput, intuitions from effective resistance in electric networks can be used, and potential values corresponding to effective resistances can be used to build routing cost estimations. From the system model described above, the routing cost estimation problem in DRCE can be cast as a flow allocation optimization problem. DRCE solves the flow allocation optimization by assigning a potential value to the nodes in a wireless network, namely using a function $V: N \to R^+$ where $R^+$ denotes the set of non-negative real numbers. The potential function V satisfies the following boundary conditions at the sink nodes:

$$V_d = 0, d \in D \quad (2)$$

and the flow distribution conditions at non-sink nodes:

$$I_{x,y} = \frac{(V_x - V_y)}{R_{x,y}} \quad (3)$$

as well as the flow conservation constraints (Equation 1) at the non-sink nodes. Moreover, from Equations (1) and (3), the following can be obtained:

$$V_x = \sum_{y \in Z(x)} \frac{g_{x,y}}{g_x} V_y + \frac{I_x}{g_x} \text{ where } g_x = \sum_{y \in Z(x)} g_{x,y}, x \in N/D. \quad (4)$$

Equation (3) specifies a localized rule on how data is routed at each node x based on local information, namely its and its neighbors' potential values. Here, data only flows from node x towards one of its neighboring nodes y with lower potential ($V_y < V_x$). The amount of data routed along the edge (x,y) is inversely proportional to R(x,y), or equivalently proportional to $g_{x,y} := 1/R_{x,y}$, which is referred to as the conductance of edge (x,y). The boundary conditions (Equation 2) ensure that the sink nodes have the lowest possible potential (namely, zero potential) so that data can always flow towards the sinks and are eventually "absorbed" at the sinks. As will be shown below, the potential field defined above may guarantee the existence of a unique flow allocation $\{I_{x,y}:(x,y) \in E\}$ such that it can minimize the following global objective function:

$$E = \frac{1}{2} \sum_{x,y} I_{x,y}^2 R_{x,y} = \frac{1}{2} \sum_{x,y} g_{x,y}(V_x - V_y)^2. \quad (5)$$

Figure 5A:
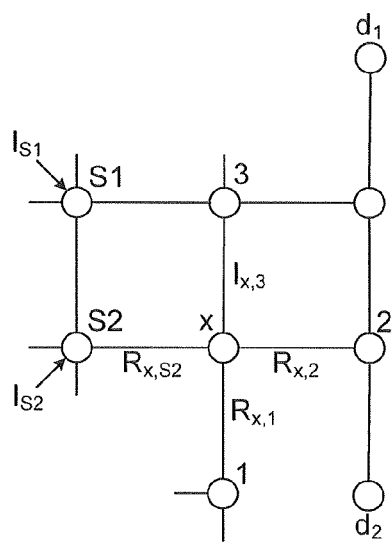
Figure 5B:
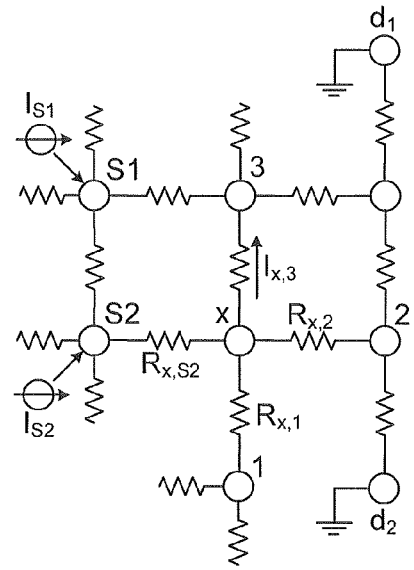

FIGS. 5A and 5B illustrate an analogy and equivalence between a communication network (shown in FIG. 5A) with a system model as described above and an electrical resistive network (shown in FIG. 5B). This equivalence becomes clear if the following interpretations are made: $R_{x,y}$ as resistance on edge (x,y), $I_{x,y}$ as the electric current flowing through edge (x,y), and $V_x$ as the voltage at node x. Equation (3) may represent Ohm's law and Equation (1) may represent Kirchhoff's law, while the boundary conditions (Equation 2) correspond to the voltage grounding at the sinks. From resistive electric network theory, the energy dissipated by a current flow $I_{x,y}$ over a wire (edge) of resistance $R_{x,y}$ is given by $E_{x,y} = I_{x,y}^2 R_{x,y} = g_{x,y}(V_x - V_y)^2$. Thompson's principle from electrical theory states that the flow pattern of current within an electrical network is that which minimizes the total energy dissipation $$\sum_{x,y} E_{x,y}$$

(the objective function in Equation 5) over all flow patterns achieving the same total current. Or equivalently, its Lagrangian dual, Dirichlet's principle states that the voltages (potentials) taken (by nodes) within an electrical network minimize the total energy dissipation given by Equation (5).

Given a network configuration with graph G (nodes N and edges E), source node s, and destination node d, if a unit current flow is injected from node s and node d is grounded in the corresponding electric network of G, the yielded potential values would rank the nodes and allocate flows in a way so that the effective resistance between s and d, denoted as $R_{\mathit{eff}}$, is minimized. When applying a unit current source on node s and grounding node d, the total energy dissipation inside the network can be expressed as:

$$E = I_{s,d}^2 * R_{\mathit{eff}}(s,d) \tag{6}$$

Since $I(s,d)=1$, $E=R_{\mathit{eff}}(s,d)$.

Figure 6:
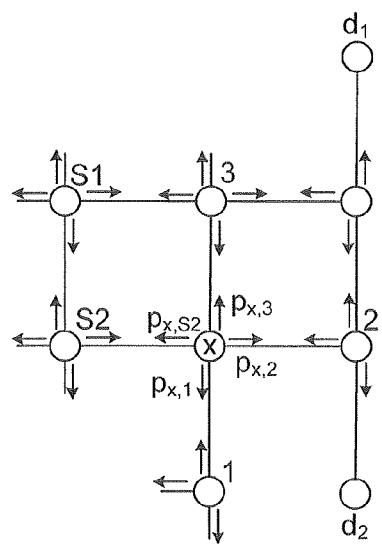

From Thompson's Law, it is known that the voltage and current distribution in graph G minimizes the total energy dissipation inside graph G given source node s and destination node d. Therefore, the voltage distribution (the potential values) and current distribution (flow allocation) produced in the corresponding electric network may produce the minimum effective resistance between nodes and d. Armed with this, the voltage values in a corresponding electric network can be used as estimations of the routing cost in Chaotic Routing in the hope that it maximizes the throughput from nodes s to d (since the effective resistance between them is minimized). This intuition is further explained by the fact that these voltage values are hitting probabilities in a corresponding random walk game, which is illustrated in FIG. 6. This connection between the electric network and the random walk game also can be used to develop a distributed algorithm for efficient evaluation of the potential field. The algorithm allows the nodes to calculate scalar values (the potential values) for data messages sent from a source node to a destination node d and to use those scalar values to identify the flow rate of data from the source node s to the destination node d.

Distributed Algorithms for RWM Estimation

The potential field estimation problem is governed by Equation (4), which is referred to as Kirchhoff's equation in electric network theory, under boundary conditions specified in Equation (2). Wrapping the problem expression in the form of a matrix yields:

$$M\overline{V} = \overline{I} \tag{7}$$

where M is the conductance matrix, $\overline{V}$ is the potential vector, and $\overline{I}$ is the vector of internal data generation/consumption rates. The existence and uniqueness of the solution to this problem can be determined from electric network theory.

A traditional way of solving this problem (via computing the inverse of M) may be infeasible or undesirable in WSN or other wireless environments because centralized data collection and processing are needed. Instead, an iterative and localized algorithm based on random walk games can be used to progressively approach the equilibrium potential field.

Consider experiments of random walks in graph G illustrated in FIG. 6, where every node can be associated with a fixed value m. Starting from an arbitrary node x, a walker, initially with zero money in hand, goes to one of its adjacent nodes with probability $p_{x,i}$ for $i \in Z(x)$. This walker keeps going in the same fashion inside the graph until it reaches one of the sink nodes ($d_1$ or $d_2$). Every time the walker passes a node i, it collects a fixed amount of money equal to $m_i$. After a large number of experiments, central limit theorem guarantees that the expectation of the total money collected by the walker, $f(x)$, converges to:

$$f(x) = \sum_{i=1}^{deg(x)} p_{x,i} f(i) + m_x. \tag{8}$$

If $f(i)=0$, $i \in D$ as a walker starting from a sink node immediately stops. Observe that Equation (8) is equivalent to Equation (4) when $p_{x,i}$ and $m_x$ are designed as follows:

$$p_{x,i} = \frac{g_{i,x}}{\sum_{k=1}^{deg(x)} g_{k,x}} \tag{9}$$

$$m_x = \frac{I_x}{\sum_{k=1}^{deg(x)} g_{k,x}}. \tag{10}$$

This mathematical equivalence warrants that the expectation of the total money collected by a walker starting from node x converges to the potential value at node x. While this analogy provides a distributed way for individual nodes to estimate its potential value without the need of computing the inverse of the matrix M, this method may still be impractical in a WSN or other wireless environment. The method could therefore be modified by neighborhood of the starting point and by applying Equation (8) iteratively on all nodes until the whole network reaches an equilibrium state. With this modified method, only local broadcasting of information among adjacent nodes is needed. Overall communication overhead can therefore be reduced through adjusting the accuracy requirement. Also, the nature of the potential field (as a smooth harmonic function) may ensure localized effect of perturbations that further reduces potential field maintenance overhead.

The pseudo-code for this algorithm is presented below. This pseudo-code describes how the entire network can reach global equilibrium. Each node may only need to periodically execute the steps from line 12 to line 19.

```
PotentialFieldConstruct (N, I, Sinks, tolerance)
Require:   Set of all nodes N, array of packet generation
           rate I, set of sink nodes Sinks, error tolerance
           tolerance
Ensure:    The equilibrium potential field
 1:   Variables: P nodePotentials, x nodeId
 2:   for each x ∈ N
 3:      if x ∈ Sinks
 4:         then P[x] ← 0
 5:      else P[x] ← arbitrary non-negative number
 6:      endif
 7:   endfor
 8:   equilibrium ← false
 9:   while (equilibrium ≠ true)
10:      equilibrium ← true
11:      for each x ∈ N
12:         if x ∉ Sinks
13:            then newP ← apply Equation (8)
14:            else newP ← 0
15:         endif
16:         if |P[x] − newP| ≧ tolerance
17:            then equilibrium ← false
18:         endif
19:         P[x] ← newP
20:      endfor
21:   endwhile
22:   return P
```

The PotentialFieldConstruct algorithm, when tolerance→0, converges to the unique solution of Equation (7) with an arbitrary non-negative initial guess of potential values and in any iteration order. The whole network here can obtain a minimum energy state, which corresponds to the solution due to Thompson's Law and Direchlet's Law.

The basic forwarding rules of Chaotic Routing may require that messages always be forwarded from higher potential nodes to lower potential nodes. Thus, the potential values of nodes along a path decrease monotonically when the potential field is in equilibrium state, and no forwarding loops are formed. It may be noted that node x may have the minimum potential value among its neighboring nodes if and only if x is a sink node. Taken together, these enable efficient protocol design in DRCE as there is no need for loop-preventing mechanisms and last resort flooding for getting messages out of a local dead-end.

In addition, the absolute potential value changes caused by an event at node x are attenuated to zero over the number of hops from node x. Any perturbation therefore only has partial influence on each one of its neighbors since each neighbor usually has multiple neighbors. Thus, the further away from the event center, the less effect the perturbation has. This helps to ensure the scalability of DRCE in large-scale WSNs and other wireless networks since it guarantees that only local areas of a potential field need to be updated in reaction to local events. In some embodiments, the event perturbation decays faster with a larger radius range for the nodes, which corresponds to a higher network density where more nodes are likely to contribute to the averaging process. Thus, better robustness through locality could be achieved with a denser deployment of wireless nodes. The spatial effect of events (such as a link cost increase, a link outage, or a new node joining the network) similarly can decay exponentially, resulting in much lower overhead following network perturbations. DRCE can also show a clear decrease in convergence time, communication overhead, and reduced spatial effect for higher levels of error tolerance (such as for a relative tolerance greater than 0.6%). This accuracy can be sufficient for preventing local potential minima and successfully forwarding all packets to sinks.

It may be noted that the initialization of the potential field may occur in any suitable manner, such as by using a pre-computed distribution guess. Also, message exchange overhead can be reduced or minimized in DRCE, such as by using a similar technique proposed in Ye et al., "A Scalable Solution to Minimum Cost Forwarding in Large Sensor Networks," Proceedings of ICCCN'01, May 2001 (which is incorporated by reference).

In this way, nodes can determine RWM values, which are then used (by the CTS function 404) to route data between a source node s and a destination node d. The path metric can be constructed in a distributed and scalable way, and it provides a throughput improvement over conventional schemes like shortest cost path metrics. This path metric can take into account all possible paths in computing routing costs and can be readily integrated into existing routing protocols (such as Link State protocol) to replace the metrics computation while maintaining the control message exchange mechanisms.

Cost-Based Transmission Scheduling

The CTS function 404 uses the RWM path metric values determined by the DRCE function 402 to schedule transmissions of data messages. The introduction of linear network coding (via functions 406a-406b) into Chaotic Routing allows the quantitative measurement of the information level each node achieves and the effect of a particular transmission. Before discussing the CTS function 404, the concept of Information Propagation Progress (IPP) can be defined as follows:

$$IPP_x = \sum_{(i \in N(x)) \wedge (C_x > C_i) \wedge (L_x > L_i)} p_{x,i}(C_x - C_i). \quad (12)$$

Here, $N(x)$ denotes the set of nodes that are in a one-hop neighborhood of node x, and $C_x$ denotes the routing cost from node x to the destination (computed using DRCE). Also, $L_x$ denotes the information level at node x (which is defined as the rank of the data cache in node x normalized by the batch size). Further, $p_{x,i}$ denotes the transmission link quality from node x to node i (the probability that a broadcast from node x is successfully received by node i).

IPP is defined as the sum of routing cost improvements over all possible receivers who are closer to the destination and have less information than the transmitter, weighted by the respective link qualities. IPP naturally estimates the expected potential information propagation progress toward the destination a single broadcasting could make. Giving priorities to transmissions that have the highest IPPs in the nodes' neighborhoods may yield maximum information propagation. Based on this, the CTS function 404 can be designed to provide local transmission scheduling as follows:

Estimate IPP on all nodes, performed by every node exchanging its information level and IPP with all nodes in its two-hop neighborhood.

On each time slot, only the node with the highest IPP value in its two-hop neighborhood gets to make a transmission. Since every node keeps track of its two-hop neighbors' IPPs, there is no other control mechanisms needed.

Finally, every node performs CSMA before transmitting a coded message.

The CTS function 404 allows the nodes that can make the most progress in information propagation highest priorities to grab a wireless channel. Since every node only needs to exchange information with its two-hop neighborhood, the CTS function 404 is scalable (scales to the density of the network). Overall, this localized scheduling scheme has the potential to reduce the total number of transmissions needed for data routing from source to destination by maximizing information propagation gain on each transmission and enabling link level passive acknowledgement. Note that this functionality can be utilized in any suitable location, such as by integrating it into Layer-2.5 functions (between MAC and routing layers) for any opportunistic routing scheme with application of network coding.

Localizing Node Interactions

Current opportunistic routing schemes often require using a link state protocol to build a global topology on each node and to compute a global forwarder list based on routing cost estimations. This requirement of global information renders current opportunistic routing approaches applicable only in static mesh networks and causes poor scalability. The Chaotic Routing scheme can eliminate this global forwarder list requirement, allowing scalable and resilient routing planes to be used in dynamic mesh network environments.

The Chaotic Routing scheme uses localized information exchange mechanisms, coupled with the IPP transmission scheduling scheme. The idea here is to replace a global forwarder list with a local one in the wireless nodes. This also allows a forwarder list field to be removed from message headers. The behavior of an arbitrary node can occur as follows. The node could maintain the following information: a list of its two-hop neighbors, a list of link qualities of its one-hop neighbors, the IPPs of its two-hop neighbors, its own information level, and an expiration time for the information. Note that global information for the entire wireless network is not required.

A control message can be periodically broadcast by a node, such as by using CSMA. The control message could include the following fields: the node's unique ID, a sequence number, IPPs of the node's one-hop neighbors, the node's information level, and the node's receiving success count (used for link quality estimation). This control message can automatically serve as a "hello" message used for the detection of nodes joining and leaving the network. Upon receiving a control message, a receiving node can update its state information and associated expiration times, and expired information can be periodically deleted.

A node may transmit data in the wireless network as follows. A node may attempt to transmit a data message whenever its IPP is greater than zero, meaning it has more information than one of its neighbors that is closer to the destination. The node may stop transmitting when its IPP is less than or equal to zero, meaning a transmission does not make any information propagation progress (and there is no point to attempt it). A back-off time can be used when attempting to transmit a data message. The back-of time period can be based on the node's own IPP and the computed IPPs of its two-hop neighbors. If the node's own IPP is ranked $n^{th}$ in the IPP list (excluding equal values), the back off time can be calculated as $t=n*T$, where T is a minimum time slot with a period around the transmission time of a single message. CSMA may always be applied before physically starting a transmission, but this scheduling may significantly reduce the probability of collisions. In one, some, or all outgoing messages, the node's current information level can be included, which can ensure timely passive acknowledgement and implicitly trigger IPP updates in the node's one-hop neighbors.

A node may receive data in the wireless network as follows. When receiving a data message, the node checks its novelty by determining whether the new message is independent of the messages in its data buffer. If not, the message is discarded. If so, the message is saved in the buffer, and the node's information level is updated. Also, the node's stored IPPs can be updated according to the information level in the received message. The received message could then be forwarded according to the transmit functionality described above.

In this design, each node may only need to exchange information with its one-hop neighbors and maintain two-hop neighbor information (instead of global network topology and global forwarder lists). The global forwarder list is replaced with local forwarder lists (a list of a node's two-hop neighbors ordered by their IPPs). Whether a node has data to transmit is automatically captured in its IPPs. Passive acknowledgements are also achieved by information level and IPP exchanges. These features can potentially enable less wasted transmissions, enhancing network throughputs. These functions can be used in conjunction with any opportunistic routing schemes with network encodings, including the Chaotic Routing framework.

Figure 7:
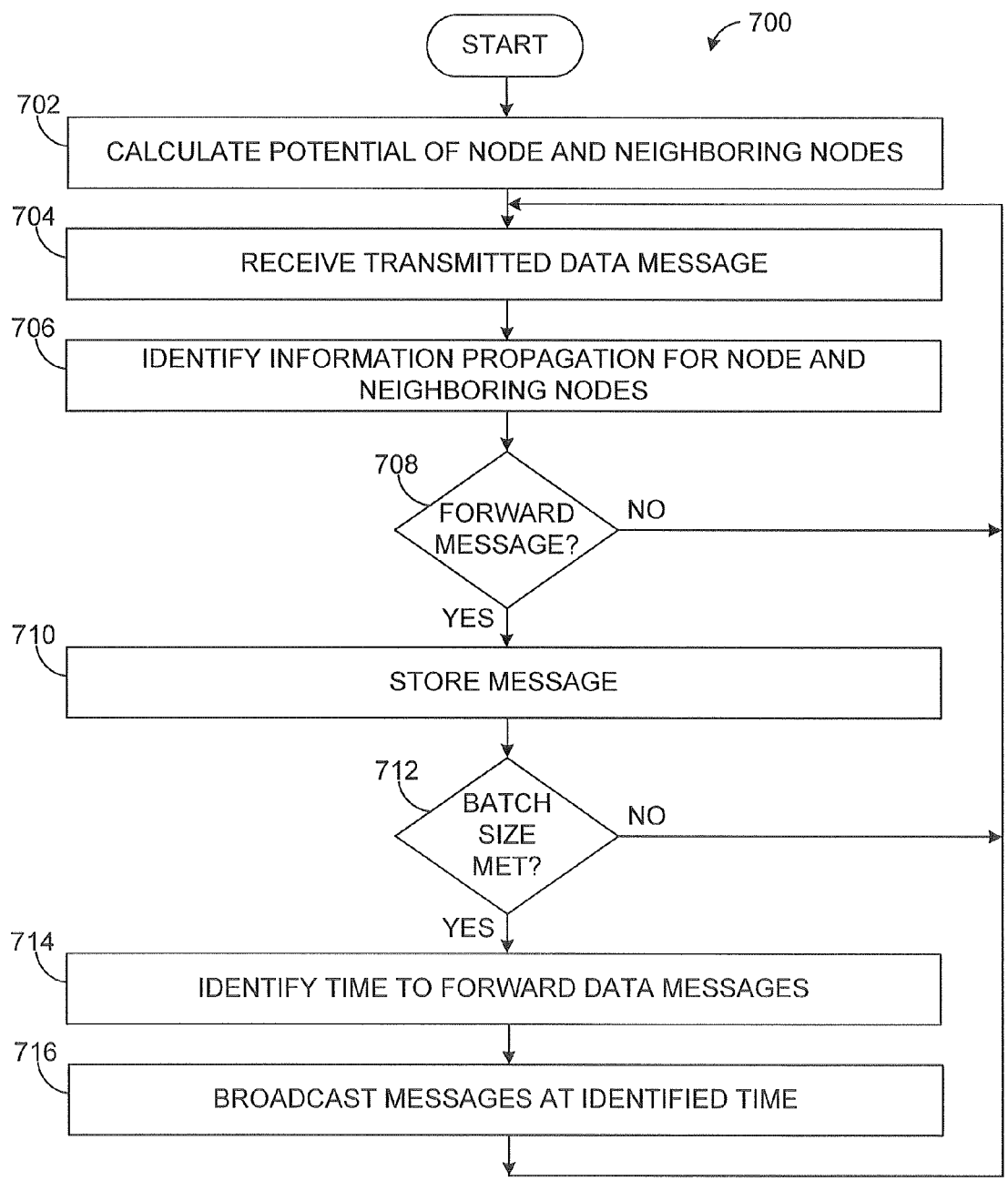

FIG. 7 illustrates an example method 700 for routing data in a wireless network in accordance with this disclosure. As shown in FIG. 7, a node calculates its potential value and the potential value(s) of its neighboring node(s) at step 702. This could include, for example, the node using the pseudo-code algorithm shown above to calculate its and its neighbors' potential values.

A transmitted data message is received at step 704. This could include, for example, the node receiving a wireless transmission from one of its neighboring nodes. The data message could be originally sent by a source node and be intended for a destination node.

The node determines an information propagation level associated with that node and with its neighboring node(s) at step 706. This could include, for example, the node calculating IPP values for itself and its neighboring nodes. The node decides whether it should forward the message at step 708. This could include, for example, the node determining whether to forward the message based on the calculated IPP values. If not, the method 700 returns to step 704 to await another message.

Otherwise, the message is stored at step 710. This could include, for example, storing the message in a data cache 408. A determination is then made whether an adequate number of messages have been stored at step 712. If not, the method 700 returns to step 704 to await another message. If so, a time to forward the messages is identified at step 714. This could include, for example, calculating a back-off time based on the node's own IPP and the computed IPPs of its two-hop neighbors. The stored messages are then broadcast at the identified time at step 716. This could include, for example, the node transmitting a linear combination of the messages from its buffer.

In conclusion, Chaotic Routing is a set-based broadcast routing framework with completely localized information exchange and computation. This functionality can be built as a routing protocol, such as on top of any Layer-2 protocol like 802.11 MAC in a mesh network. It can also be used to build high-performing mesh networks, such as those serving as backbones of large-scale wireless sensor networks or stand-alone mesh networks providing high data rate services (like Internet access or multimedia streaming).

Although FIGS. 3 through 7 illustrate one example of a routing mechanism for data in a wireless network, various changes may be made to FIGS. 3 through 7. For example, while shown as a series of steps in FIG. 7, various steps in FIG. 7 could overlap, occur in parallel, or occur in a different order.

Figure 8:
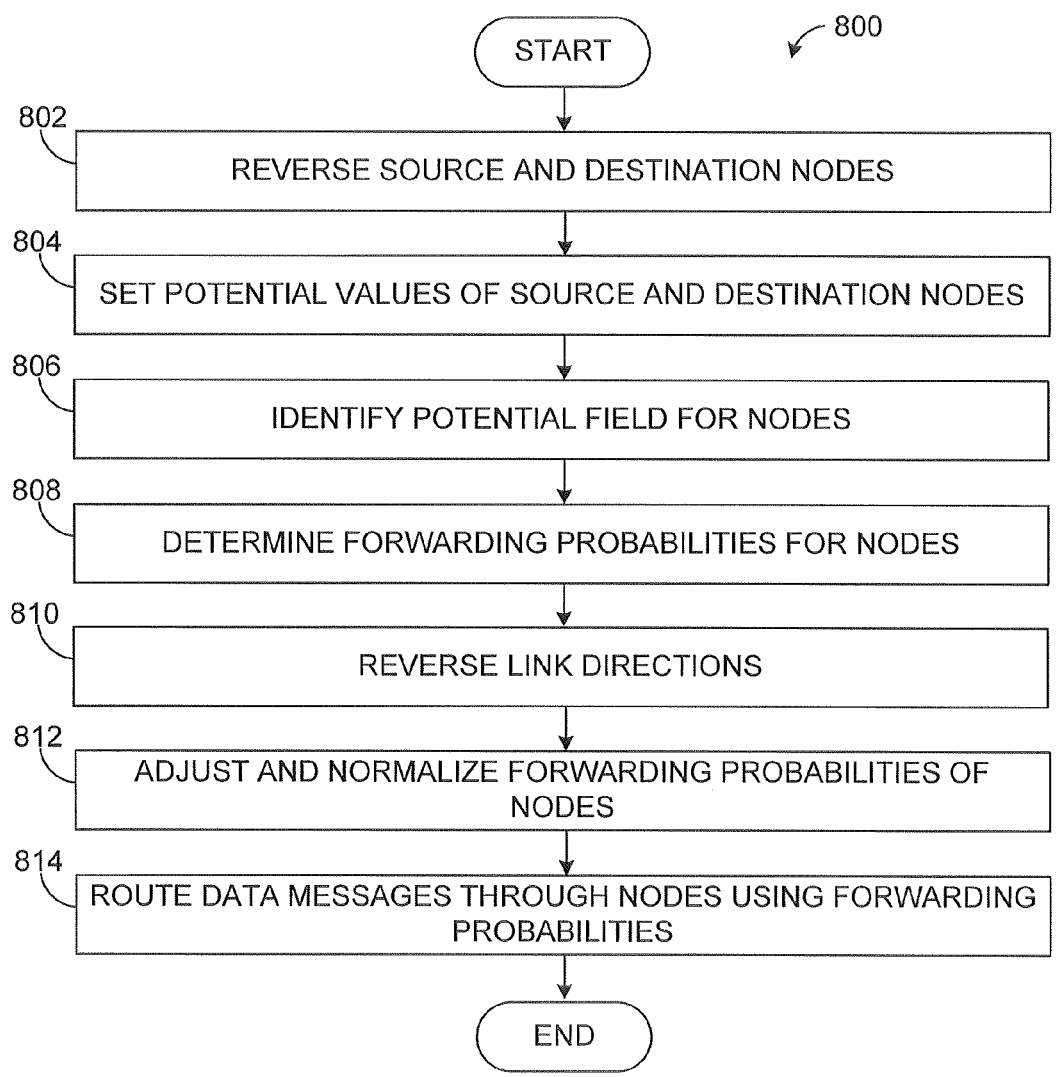
FIGS. 8 through 10 illustrate an example multicasting mechanism for data in a wireless network in accordance with this disclosure.
Figure 9:
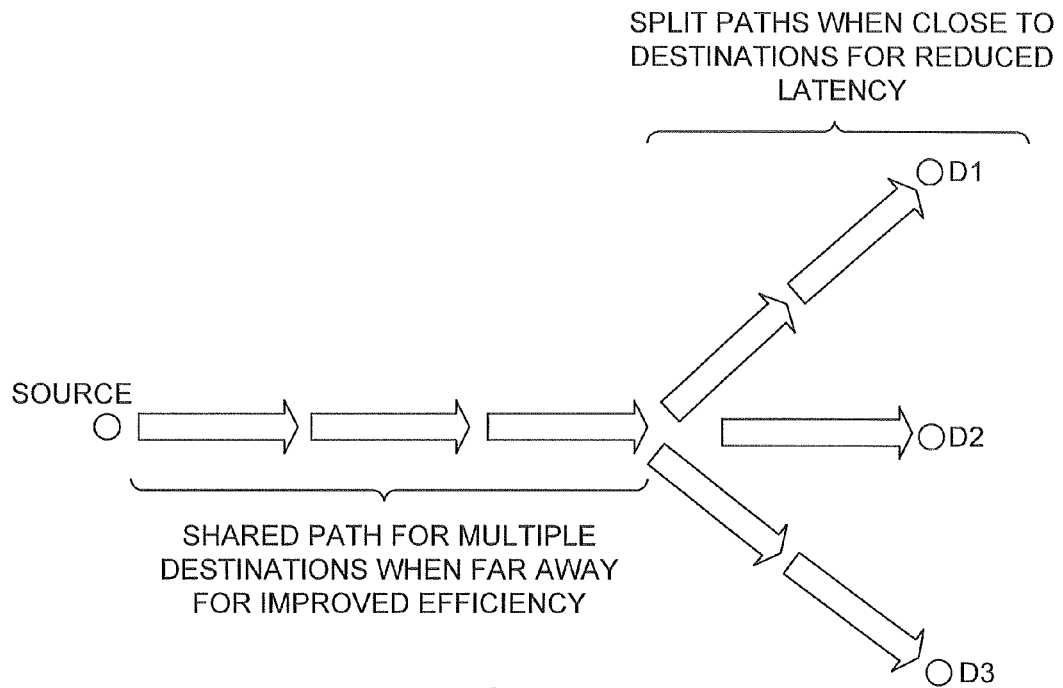
Figure 10:
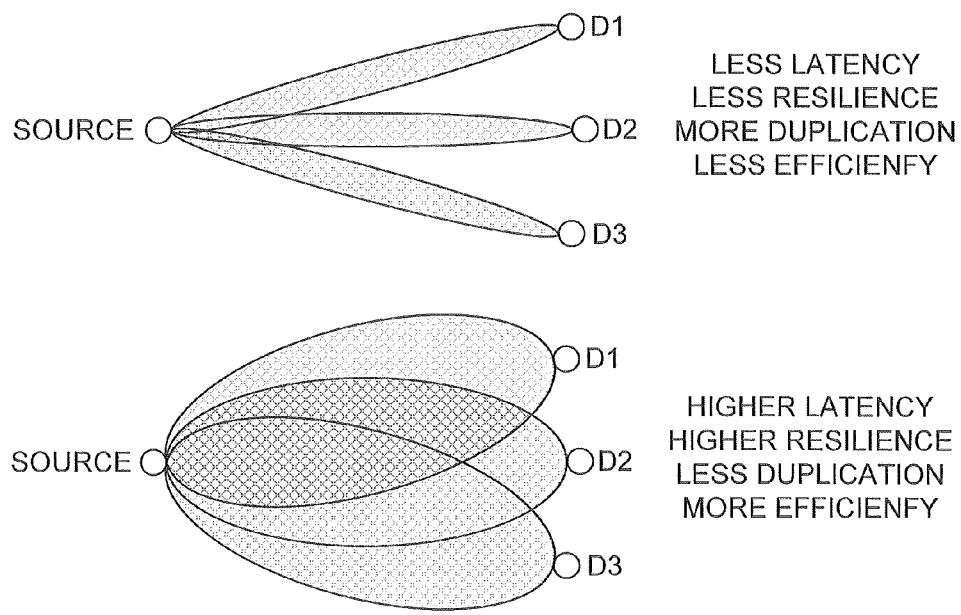

FIGS. 8 through 10 illustrate an example multicasting mechanism for data in a wireless network in accordance with this disclosure. The details of the multicasting mechanism shown in FIGS. 8 through 10 are for illustration only. The multicasting mechanism could be implemented in any other suitable manner without departing from the scope of this disclosure.

The Chaotic Routing mechanism described above may be useful in situations such as anycasting and unicasting. Anycasting refers to the transmission of data from a source to a set of destinations, where success is defined as the receipt of the data by any of the destinations. Unicasting refers to the transmission of data from a source to a single destination, where success is defined as the receipt of the data by the destination. Unicasting is a special case of anycasting (where the set of destinations represents a single destination).

Multicasting refers to the transmission of data from a source to a set of destinations, where success is defined as the receipt of the data by all of the destinations. Many-to-many multicasting involves the transmission of packets or other datagrams to a group of hosts from many possible sources, where each source has the same copies of the original packets and each destination receives one copy of each original packet. Multicasting is often a fundamental service in wireless mesh networks and can efficiently support a variety of applications that are characterized by close collaborative efforts. Examples include content dissemination through multiple mirrored sites. Ad hoc wireless networks can be used where building an infrastructure is not available or feasible and link qualities may be low and volatile.

Traditional multicasting approaches have been primarily supporting multicasting from a single source with no systematic extension to support multiple sources (multiple caching points). Tree-based and mesh-based approaches often require explicit construction and maintenance of forwarding structures, so they suffer large overhead and generally perform poorly when mesh networks experience high dynamics. A large number of states also makes these approaches less feasible to be applied in wireless sensor networks with extremely limited resources. Existing stateless approaches, while only maintaining a limited number of states, cannot scale to support large receiver groups.

In accordance with this disclosure, multicasting in wireless mesh networks occurs with proportional traffic allocation towards multiple caching points. This can provide improved scalability, robustness and resilience to network dynamics, bounded state information, and significantly reduced transmission overhead. This approach involves leveraging a potential-based routing framework (such as that described above or in "PWave: A Multi-source Multi-sink Anycast Routing Framework for Wireless Sensor Networks," which is incorporated by reference) that provides a scalable and resilient solution based on the analogy between communication networks and electric networks. By identifying the duality between the problem of many-to-many multicasting and that of many-to-many anycasting, the multicasting problem is solved by mapping it to its dual anycasting problem, solving the dual anycasting problem using the potential-based routing framework, and mapping the solution back to solve the original many-to-many multicasting problem. This inheres from the potential-based routing framework all the desirable properties, such as proportional traffic allocation, scalability to network density, and resilience to network dynamics.

Many-to-many multicasting from a set of source nodes (denoted S) to a set of destination nodes (denoted D) requires a copy of every distinctive message coming out of any one of the nodes in set S to be received by every node in set D. This problem is a dual to the problem of many-to-many anycasting from the set of nodes D to the set of nodes S, where every packet coming out of each node in set D needs to be routed to any one of the nodes in set S. The duality can be readily demonstrated as the reverse paths of the solution to the anycasting problem could form a solution to the original multicasting problem.

FIG. 8 illustrates a method 800 for performing many-to-many multicasting in a wireless network in accordance with this disclosure. As shown in FIG. 8, the source and destination nodes for a many-to-many multicasting problem are reversed at step 802. For example, given an original source set S and an original destination set D, the source nodes are placed in set D and the destination nodes are placed in set S. The potential values of the source and destination nodes are fixed at step 804. This could include, for example, fixing the potential values of all nodes in set S to zero and fixing the data generation rates for all nodes in set D to one.

A potential field for the nodes is identified at step 806. This could include, for example, using a potential-based routing framework to construct a unique potential field for the network configuration. The potential field could be determined in a distributed and incremental manner, such as is shown and described above. The forwarding probabilities for the nodes are then determined at step 808. This could include, for example, applying Ohm's Law on all links between the nodes (consistent with electrical network theory as described above).

The directions of the links are then reversed at step 810, and the forwarding probabilities of the nodes are adjusted at step 812. This effectively reverses the reversal performed at step 802. This could include ensuring that the sum of incoming probabilities for each node is equal to the maximum of all outgoing links for that node. The incoming probabilities can be normalized proportionally (if necessary) to satisfy this condition. Data messages can then be routed through the nodes at step 814. This could include, for example, data packets being forwarded by the nodes following the forwarding probabilities of the nodes' outgoing links. A packet need not be forwarded further once it has reached one of the destination nodes in set D.

Any many-to-many multicasting solution may need to ensure that each node in set D receives one copy of each distinctive data message. This could be guaranteed by the fact that the forwarding probabilities are computed with a data rate of one for each node in set D in the dual problem. Therefore, the expected overall probability that a copy of a message is delivered to every node in set D is also one, though the messages may come from different source nodes in set S.

Because the potential-based routing framework allocates traffic inversely proportional to path costs, paths with high costs receive less traffic. Traffic going to destination nodes close to each other may share many nodes along their respective paths. Duplications can therefore be reduced since, at most, one copy of a message needs to be transmitted on each hop. This saving is generally more applicable to nodes closer to a source node and farther away from destination nodes as shown in FIG. 9.

The potential-based routing framework may allow easy adjustment of multi-path spreading along shortest paths by shutting off paths with low forwarding probabilities. This feature can be directly used to control the tradeoff between latency and efficiency. The less spreading is allowed, the closer the path selections are to individual shortest paths (thus less average latency at the cost of less efficiency due to more packet duplications in a network). The more spreading is allowed, the more path overlapping among multiple destination nodes (thus higher efficiency at the cost of higher average latency). This is shown in FIG. 10.

The scalability and robustness of this functionality can come directly from those inherent in the potential-based routing framework. Also, the potential-based routing framework could guarantee that each source node may be used by each destination node for servicing data messages. The probability of a source node servicing a destination node is proportional to the effective path cost between them (based on Ohm's Law). In addition, group management is equivalent to source management in the potential-based routing framework. A node joining a receiver group is thus equivalent to the node starting the sending of potential value updates, with its own data generation rate in the dual problem set to one. A node leaving the receiver group is equivalent to resetting the node's data generation rate in the dual problem to zero. In order to use this functionality, a potential-based routing framework in a mesh network and logic for reversing forwarding probabilities are implemented in the nodes. The implementation of this functionality is efficient in that the number of states needed to be maintained is bounded by the maximum number of one-hop neighbors, in addition to the inherent properties of loop-free and no local minima. As a particular example, this functionality can be built as a data plane forwarding protocol on top of a potential-based routing plane protocol (such as PWave). One application of this concept is to use it for command dissemination over a wireless sensor network, which is often an essential function in WSNs.

Although FIGS. 8 through 10 illustrate one example of a multicasting mechanism for data in a wireless network, various changes may be made to FIGS. 8 through 10. For example, while shown as a series of steps in FIG. 8, various steps in FIG. 8 could overlap, occur in parallel, or occur in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc or digital versatile disc (DVD), or any other type of medium.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

What is claimed is:

1. A method comprising:
identifying, at a first wireless node, routing costs associated with routing data to a destination through multiple paths in a wireless network;
identifying, at the first wireless node, information propagation values associated with the first wireless node and at least one second wireless node, wherein the information propagation values are based on the routing costs and wireless link qualities associated with the wireless nodes;
scheduling transmission of the data by the first wireless node based on the information propagation values; and
transmitting the data based on the scheduling;
wherein the data comprises multiple data messages; and
wherein the method further comprises encoding at least a portion of the data messages at the first wireless node using a linear random coding scheme.

2. The method of claim 1, wherein the routing costs comprise potential values associated with distances of the wireless nodes from the destination.

3. The method of claim 2, wherein the data flows to the destination along at least one of the paths having monotonically decreasing potential values.

4. The method of claim 1, wherein the information propagation values indicate which of the wireless nodes have a greater chance of propagating the data towards the destination in a single broadcast.

5. The method of claim 1, further comprising:
not scheduling transmission of second data by the first wireless node if the first wireless node's information propagation value is less than zero.

6. The method of claim 1, wherein the linear random coding scheme uses random coding coefficients in a coding vector.

7. The method of claim 1, wherein the wireless network comprises a wireless sensor network in an industrial control and automation system.

8. A method comprising:
identifying, at a first wireless node, routing costs associated with routing data to a destination through multiple paths in a wireless network;
identifying, at the first wireless node, information propagation values associated with the first wireless node and at least one second wireless node, wherein the information propagation values are based on the routing costs and wireless link qualities associated with the wireless nodes;
scheduling transmission of the data by the first wireless node based on the information propagation values; and
transmitting the data based on the scheduling;
wherein the at least one second wireless node comprises one or more nodes in a two-hop neighborhood around the first wireless node; and
wherein scheduling the transmission of the data comprises identifying a back-off time for the first wireless node, the back-off time based on rankings of the information propagation values for the wireless nodes.

9. A wireless node comprising:
a transceiver configured to communicate wirelessly with at least one second wireless node; and
a controller configured to:
identify routing costs associated with routing data to a destination through multiple paths in a wireless network;
identify information propagation values associated with the wireless node and the at least one second wireless node, wherein the information propagation values are based on the routing costs and wireless link qualities associated with the wireless nodes;
schedule transmission of the data based on the information propagation values; and
initiate the transmission of the data based on the scheduling;
wherein the controller is further configured to not schedule transmission of second data if the wireless node's information propagation values is less than zero.

10. The wireless node of claim 9, wherein:
the routing costs comprise potential values associated with distances of the wireless nodes from the destination; and
the information propagation values indicate which of the wireless nodes have a greater chance of propagating the data towards the destination in a single broadcast.

11. The wireless node of claim 9, wherein:
the data comprises multiple data messages; and
the controller is further configured to encode at least a portion of the data messages.

12. The wireless node of claim 9, wherein the controller is further configured to identify a transmission from another wireless node and to use the identified transmission as a passive acknowledgement.

13. A wireless node comprising:
a transceiver configured to communicate wirelessly with at least one second wireless node; and
a controller configured to:
identify routing costs associated with routing data to a destination through multiple paths in a wireless network;
identify information propagation values associated with the wireless node and the at least one second wireless node, wherein the information propagation values are based on the routing costs and wireless link qualities associated with the wireless nodes;
schedule transmission of the data based on the information propagation values; and
initiate the transmission of the data based on the scheduling;
wherein the at least one second wireless node comprises one or more nodes in a two-hop neighborhood around the wireless node; and
wherein the controller is configured to schedule the transmission of the data by identifying a back-off time for the wireless node, the back-off time based on rankings of the information propagation values for the wireless nodes.

14. A wireless node comprising:
a transceiver configured to communicate wirelessly with at least one second wireless node; and
a controller configured to:
identify routing costs associated with routing data to a destination through multiple paths in a wireless network;
identify information propagation values associated with the wireless node and the at least one second wireless node, wherein the information propagation values are based on the routing costs and wireless link qualities associated with the wireless nodes;
schedule transmission of the data based on the information propagation values; and
initiate the transmission of the data based on the scheduling;
wherein the data comprises multiple data messages; and
wherein the controller is configured to encode at least a portion of the data messages using a linear random coding scheme.

15. The wireless node of claim 14, wherein the linear random coding scheme enables the wireless nodes to not track which messages are received by each of the nodes.

16. A wireless node comprising:
a transceiver configured to communicate wirelessly with at least one second wireless node; and
a controller configured to:
identify routing costs associated with routing data to a destination through multiple paths in a wireless network;
identify information propagation values associated with the wireless node and the at least one second wireless node, wherein the information propagation values are based on the routing costs and wireless link qualities associated with the wireless nodes;
schedule transmission of the data based on the information propagation values; and
initiate the transmission of the data based on the scheduling;
wherein the data comprises multiple data messages; and
wherein the controller comprises:
a distributed routing cost estimator configured to identify the routing costs;
a cost-based transmission scheduler configured to schedule the transmission of the data; and
a randomized network encoder configured to encode at least a portion of the data messages.

17. A wireless node comprising:
a transceiver configured to communicate wirelessly with at least one second wireless node; and
a controller configured to:
identify routing costs associated with routing data to a destination through multiple paths in a wireless network;
identify information propagation values associated with the wireless node and the at least one second wireless node, wherein the information propagation values are based on the routing costs and wireless link qualities associated with the wireless nodes;
schedule transmission of the data based on the information propagation values; and
initiate the transmission of the data based on the scheduling;
wherein the at least one second wireless node comprises one or more nodes in a two-hop neighborhood around the first wireless node;
wherein the controller is configured to identify the routing costs using only information exchanges involving the one or more nodes in the two-hop neighborhood; and
wherein the controller does not use any global forwarder lists for forwarding the data to the destination.

18. A non-transitory computer readable medium embodying a computer program, the computer program comprising computer readable program code for:
identifying, at a first wireless node, routing costs associated with routing data to a destination through multiple paths in a wireless network;
identifying, at the first wireless node, information propagation values associated with the first wireless node and at least one second wireless node, wherein the information propagation values are based on the routing costs and wireless link qualities associated with the wireless nodes;
scheduling transmission of the data by the first wireless node based on the information propagation values; and
initiating the transmission of the data based on the scheduling;
wherein the at least one second wireless node comprises one or more nodes in a two-hop neighborhood around the first wireless node; and
wherein the computer readable program code for scheduling transmission of the data comprises computer readable program code for identifying a back-off time for the first wireless node, the back-off time based on rankings of the information propagation values for the wireless nodes.

19. The computer readable medium of claim 18, wherein:
the routing costs comprise potential values associated with distances of the wireless nodes from the destination; and
the information propagation values indicate which of the wireless nodes have a greater chance of propagating the data towards the destination in a single broadcast.

20. The computer readable medium of claim 18, wherein the computer program further comprises:
   computer readable program code for not scheduling transmission of second data by the first wireless node if the first wireless node's information propagation value is less than zero.

* * * * *